United States Patent
Henderson et al.

(10) Patent No.: US 12,254,547 B2
(45) Date of Patent: Mar. 18, 2025

(54) SYSTEM AND METHOD OF HEAD MOUNTED DISPLAY

(71) Applicant: Sony Interactive Entertainment Inc., Tokyo (JP)

(72) Inventors: Christopher William Henderson, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/164,792

(22) Filed: Feb. 6, 2023

(65) Prior Publication Data
US 2023/0260179 A1    Aug. 17, 2023

(30) Foreign Application Priority Data
Feb. 11, 2022    (GB) .................................. 2201769

(51) Int. Cl.
| | |
|---|---|
| G06F 3/00 | (2006.01) |
| G06F 1/16 | (2006.01) |
| G06F 3/01 | (2006.01) |
| G06F 16/28 | (2019.01) |
| G06T 13/00 | (2011.01) |

(52) U.S. Cl.
CPC ............ G06T 13/00 (2013.01); G06F 1/163 (2013.01); G06F 3/012 (2013.01); G06F 16/288 (2019.01)

(58) Field of Classification Search
CPC ........ G06F 1/163; G06F 16/288; G06F 3/011; G06F 3/012; G06T 13/00; G06T 15/20; G06T 19/006
See application file for complete search history.

(56) References Cited

U.S. PATENT DOCUMENTS

| | | | |
|---|---|---|---|
| 2014/0268356 A1* | 9/2014 | Bolas | G02B 27/017 359/630 |
| 2017/0278306 A1 | 9/2017 | Rico | |
| 2018/0296921 A1 | 10/2018 | Watson | |

OTHER PUBLICATIONS

Combined Search and Examination Report for corresponding GB Application No. 2201769.3, 11 pages, dated Oct. 10, 2022.
Liu Sri-Hong et al., "PhantomLegs: Reducing Virtual Reality Sickness Using Head-Worn Haptic Devices", 2019 IEEE Conference on Virtual Reality and 3D User Interf Aces (VR), pp. 817-826, Mar. 23-27, 2019 (for relevancy see See Non-Pat. Lit. #1).
Extended European Search Report for corresponding EP Application No. 23153114.6, 11 pages, dated Jun. 14, 2023.

* cited by examiner

*Primary Examiner* — Insa Sadio
(74) *Attorney, Agent, or Firm* — Kilpatrick Townsend & Stockton LLP

(57) ABSTRACT

A method of head-mounted display including: generating a virtual environment for display in a first person view to a user wearing a head-mounted display, measuring a head displacement pattern of the user when they are performing a predetermined locomotive action in real life, and when the predetermined locomotive action is performed within the generated virtual environment, applying a head displacement pattern to a virtual first person viewpoint of the generated virtual environment presented to the user, the applied head displacement pattern being based upon the measured head displacement pattern, whether the user is performing the predetermined locomotive action in real life or not.

16 Claims, 2 Drawing Sheets

SYSTEM AND METHOD OF HEAD MOUNTED DISPLAY

BACKGROUND OF THE INVENTION

Field of the Invention

The present invention relates to a system and method of head mounted display.

Description of the Prior Art

Typically, virtual reality games (VR games) are displayed using a head-mounted display or 'HMD', placing the player in the viewpoint of an in-game protagonist. This enables the player to experience the game world and events in a more immersive fashion.

However, it is recognised that for some players, the disparity between visible motion and real-world motion detected by the vestibular system of the inner ear can cause nausea.

The present invention seeks to mitigate or alleviate this problem.

SUMMARY OF THE INVENTION

Various aspects and features of the present invention are defined in the appended claims and within the text of the accompanying description.

In a first aspect, a method of head mounted display is provided in accordance with claim 1.

In another aspect, a system for head-mounted display is provided in accordance with claim 11.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of head mounted display are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
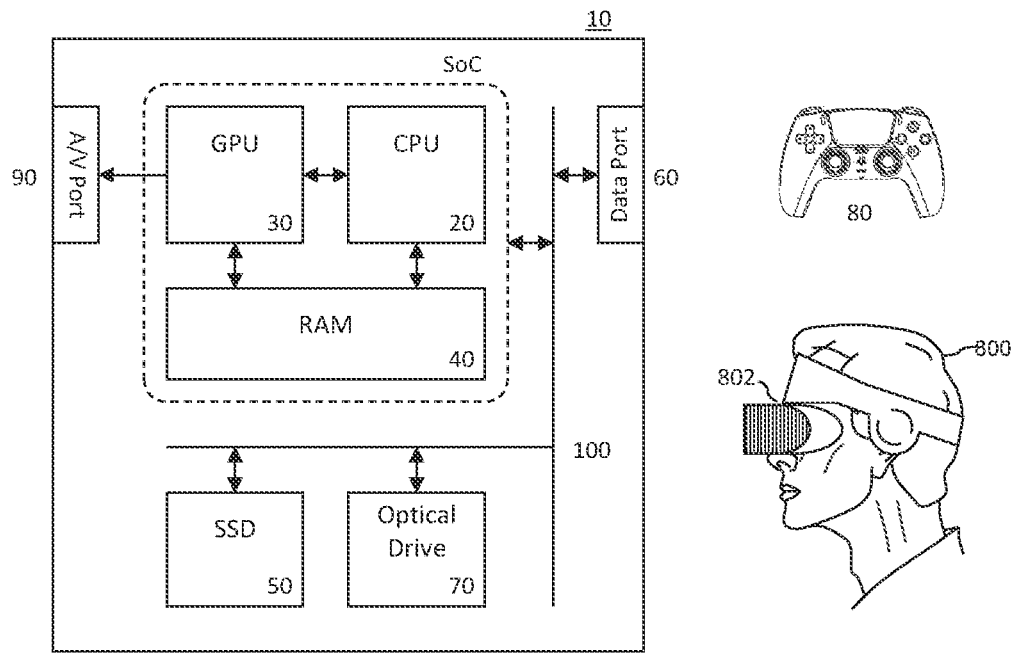
FIG. 1 is a schematic diagram of a system for head-mounted display, in accordance with embodiments of the present description.

Referring now to the drawings, wherein like reference numerals designate identical or corresponding parts throughout the several views, FIG. 1 shows an example of an entertainment system 10 as a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

The system shown in FIG. 1 represents a non-limiting example of a system for head-mounted display. Other equivalent systems may for example incorporate functions similar to those of the entertainment device 10 (e.g. PlayStation 5®) within the head-mounted display itself, or these functions may be performed remotely (for example by a real or virtualised cloud-based console), with images streamed to the head-mounted display.

Figure 2:
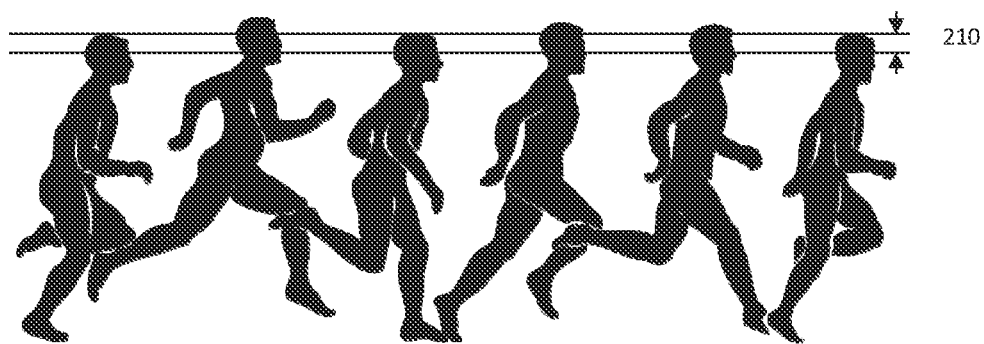
FIG. 2 is a schematic diagram of for a typical mode of locomotion used in real and virtual environments, in accordance with embodiments of the present description.

Turning now to FIG. 2, a common feature of so-called 'First Person' games, such as those typified by games presented in an HMD, is so-called 'head bob'; that is, at least a vertical oscillation of the virtual camera position to simulate a change in height 210 of the virtual character's eyes as they walk or run.

This effect improves immersion by creating a naturalistic viewpoint as the player character moves within the game, but can also increase nausea in the player by creating visual movement that is not experienced by the vestibular system of the player.

It is therefore common to have the option to turn 'head bob' off, so that movement within the game is smoothly linear. Conversely this can reduce nausea in a player, but looks unnatural.

Embodiments of the present description seek to improve upon this situation, as follows.

Figure 3:
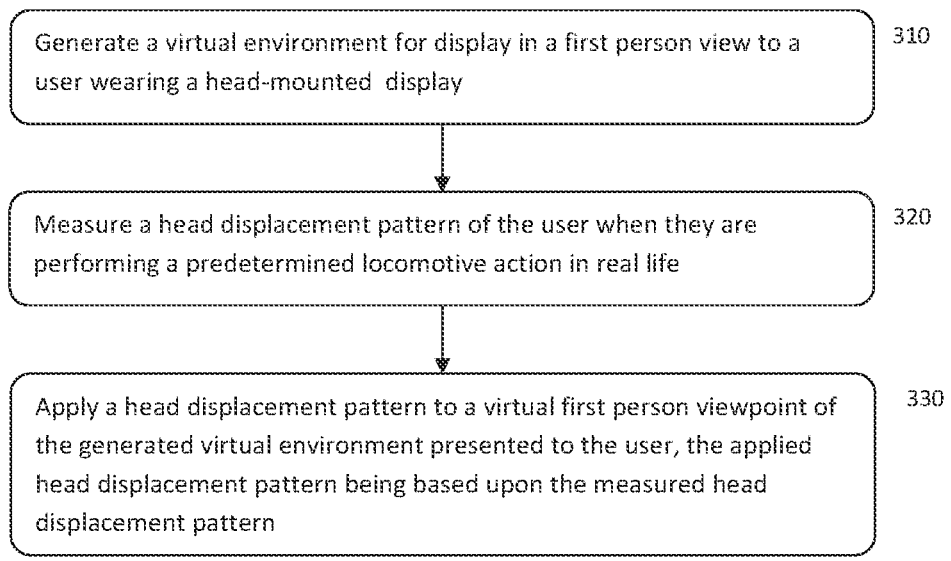
FIG. 3 is a flow diagram of a method of head mounted display, in accordance with embodiments of the present description.

Referring now to FIG. 3, a method of head-mounted display comprises the following steps.

A first step 310 comprises generating a virtual environment for display in a first person view to a user wearing a head-mounted display 802. As noted elsewhere herein, this may be generated by the entertainment device 10, or within a head-mounted display 802 with similar functionality, or may be generated by a remote server which then streams the output to either an entertainment device 10 or direct to a head-mounted display 802. Alternatively generating the virtual environment may be achieved at a client device such as the entertainment device or HMD by receiving such a stream and decoding it.

A second step 320 comprises measuring a head displacement pattern of the user when they are performing a predetermined locomotive action in real life, as described elsewhere herein. The displacement pattern can be characterised by variations in position, but similarly using motion vectors, acceleration values, or any suitable measure of change in position or associated motion causing that change.

A third step 330 comprises, when the predetermined locomotive action is performed within the generated virtual environment, applying a head displacement pattern to a virtual first person viewpoint of the generated virtual environment presented to the user, the applied head displacement pattern being based upon the measured head displacement pattern, whether the user is performing the predetermined locomotive action in real life or not, as described elsewhere herein.

Hence once the measured head displacement pattern of the user is known, it can be replicated at least in part within the game instead of using a default 'head bob' animation, and without replicating a direct ongoing feed of the predetermined locomotive action from the user.

The predetermined locomotive action may be one or more selected from the list consisting of walking, jogging, running, sprinting, jumping, and creeping or crawling, e.g. walking in a crouched position.

As noted elsewhere herein, so-called head bob is typically a vertical oscillation or pattern applied to the virtual camera position within the game, and so to a first approximation only the vertical component of the measured head displacement pattern of the user may be used to generate the user-specific head bob.

However optionally in this case the head displacement pattern applied to the first person viewpoint may also comprise a lateral component of the measured head displacement pattern of the user. Typically this is a side-to-side component caused by a rocking of the shoulders and torso. Similarly however this may optionally comprise, or also comprise, a for-and-aft component (for example due to body sway) obtained by subtracting a mean forward motion (unless the motion data was obtained by performing the activity on the spot).

In addition to these vertical, side-to-side or fore-and-aft motions, an optional rotational component (e.g. roll, pitch and yaw) may also be recorded, and these may be used in any suitable combination.

Optionally, the measured head displacement pattern in axes other than vertical may be scaled to be smaller than the original motion, in part because left-to-right motion of the virtual camera viewpoint can particularly effect aiming accuracy in some games, and/or navigation, whilst fore-aft motion of the virtual camera viewpoint may make the motion of the game seem to stutter and look more like a problem with image frame generation rates.

Returning to step 320, measuring the head displacement pattern of the user optionally comprises in turn the step of obtaining motion data from the head-mounted display when worn by the user and performing the predetermined locomotive action, the motion data being one or more selected from the list consisting of motion data from one or more accelerometers of the head-mounted display, motion data derived from images captured by one or more cameras of the head-mounted display (for example using simultaneous location and mapping, or 'SLAM' techniques); and motion data derived from images captured by one or more cameras remote from the head-mounted display, the captured images encompassing a view of the head-mounted display (for example tracking lights or other key features of the HMD from a fixed camera position to characterise head motion, and rectifying the motion based upon the observed relative positions of the lights or other key features in the images compared to a known configuration of these on the HMD).

The above techniques use the HMD as these are more likely to produce head motions consistent with motions of the user whilst wearing the HMD and hence may be both more accurate and also potentially easier to obtain as the HMD is already available.

However, unless the user is performing the or each predetermined action on the spot, they may not wish to run around whilst wearing an HMD (even if it is able to pass through a view from an in-built camera to provide the user with situational awareness).

Hence alternatively on in addition in step 320, measuring the head displacement pattern of the user optionally comprises in turn the step of obtaining motion data when the user is performing the predetermined locomotive action, the motion data being one or more selected from the list consisting of motion data from one or more accelerometers of a handheld controller held by the user, motion data from one or more accelerometers of a mobile phone kept in an item of clothing worn by the user, motion data from one or more accelerometers of a wearable device worn by the user, and motion data derived from images captured by one or more cameras remote from the user, the captured images encompassing a view of the user.

In this case, motion data from a hand-held, wrist worn, or hip-pocket contained device may be treated as a proxy for direct measurement of head motion, for example being used to drive a skeletal model of a typical person from which to derive head motion, and/or using lookup tables relating hand or hip motion to head motion.

Meanwhile motion data derived from images captured by one or more cameras remote from the user may directly capture head motion. In this case, one or more such remote cameras may be similar to the cameras used to capture images of the headmounted display as described previously, or may be cameras on the headmounted display itself, when removed from the user and placed at a suitable vantage point to observe the user's actions.

In embodiments of the present description, the method may optionally also comprise the steps of associating motion data characterising at least the vertical component of the head displacement pattern in association with an account of the user, and when that user is subsequently logged in to that account, providing the motion data to an application that requests it in order to apply a head displacement pattern to a virtual first person viewpoint of a generated virtual environment presented to the user.

Hence firstly the process of measuring the user's motion data may not necessarily occur within a particular game or for a particular game, but may for example be performed by a helper app of the operating system. In either event, the results may be stored in association with the user's account, locally and/or in a server, so that the game or any other application that requires head bob information for that user can subsequently obtain it. This means that the user does not have to repeat the measurement process for each new game that happens to provide a personalised head bob action.

Using the techniques described herein, the user's own subjective head bobbing motion for one or more locomotive actions can be captured, and at least the vertical component thereof can be used to drive a corresponding head bobbing motion when traversing a virtual environment using a virtual version of the respective locomotive action. It will be appreciated that if the in game animation cycle for a particular locomotive action is quicker or slower than the user's own real-world implementation of that locomotive action, then the corresponding measured head bobbing motion can be similarly sped up or slowed down if desired.

The data representing the head bobbing motion can be sample data (for example after removing any offsets, and optionally after any desired scaling), or may be parameterised version thereof; for example a curve fit, depending on what representation best suits an in game implementation.

In this manner, the user experiences their own subjective head bobbing motion within the virtual world, which is habituated in muscle memory and so more greatly enhances the naturalism of the game and also avoids the additional disparity between learned motion and perceived motion that can contribute towards a sense of nausea.

It will be appreciated that not all users may be able to perform any or all of the predetermined locomotive actions, for example because they do not have an external camera (if that is required for a particular implementation, as a non-limiting example), or because they do not have the space to run, or are concerned about running on the spot whilst wearing an HMD due to the presence of pets or small children, or because they have mobility difficulties.

Accordingly, in embodiments of the description the method further comprises the steps of obtaining one or more physiological measurements of the user and storing this physiological data in association with motion data characterising at least the vertical component of the head displacement pattern of that user, collating associated pairs of physiological and motion data to form a database of physiological and motion data, estimating a correlation between physiological measurements and at least a vertical component of a head displacement pattern based upon data of the database, and upon receiving one or more physiological measurements for a subsequent user, providing at least a correlating vertical component of a head displacement pattern for use with that subsequent user.

Alternatively or in addition to physiological measurements, partial locomotion action measurements can be obtained; for example a user may be able to walk and jog, but not run, sprint, jump, or crouch. In this case, complete or more complete sets of motion data can be used to determine the correlation between head displacement patterns for low intensity predetermined locomotive actions and high-intensity predetermined locomotive actions, or more generally between any given pair of predetermined locomotive actions, so that given an input of measurements for one or more predetermined locomotive actions, at least a correlating vertical component of a head displacement pattern for use with that user for another predetermined locomotive action can be obtained.

In either case, by obtaining a statistically significant number of datasets associating physiological measurements (such as height, but optionally also limb length if captured in images, or other features such as relative head size, neck length, torso shape and the like) with head displacement patterns for the predetermined locomotive actions, and/or associating head displacement patterns for different predetermined locomotive actions with each other, it is possible to estimate a correlation between physiological measurement (s) and respective head displacement patterns for different predetermined locomotive actions, or use similar correlations between locomotive actions to effectively fill in an incomplete set of head displacement patterns for different predetermined locomotive actions for a given user.

The correlation may be computed to synthesise a respective head displacement pattern, or a closest match of the available partial data may be chosen from the corpus of data to retrieve a corresponding full set of data.

The accuracy of such an obtained set of head displacement patterns is likely to increase as the number of sets in the database increases, and so optionally this process can be repeated for such users either periodically or when the database increases by a threshold amount.

The resulting set of head displacement patterns may then be used for the relevant player, and optionally associated with their account etc., as if it have been obtained by direct measurement as described elsewhere herein.

In addition, optionally developers can use the database to similarly obtain head bob information, for example to provide a set of defaults for different ages and genders (which may also be commonly available user information) so that users who do not perform the measurements can still have a more likely accurate head bob action than a global default. Similarly optionally, where a user constructs an avatar (even if they do not see it themselves, but do so for the benefit of other players), then head bob information based upon the virtual physiological measurements of the avatar may be used, either to drive the animation of the avatar seen by other users, and/or to drive the first person head bob of the user represented by the avatar.

It will be appreciated that the above methods may be carried out on conventional hardware (such as entertainment device 10, or an HMD 802 with suitable capabilities) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present description, a system for head-mounted display comprises a head-mounted display (802), a virtual environment for display in a first person view to a user wearing the head-mounted display (for example generated by an entertainment device or the HMD itself, or streamed from a remote server), as described elsewhere herein.

The system also comprises at least a first sensor for measuring a head displacement pattern of the user when they are performing a predetermined locomotive action in real life, such as an accelerometer or camera, as described elsewhere herein.

The system also comprises a viewpoint displacement processor (e.g. CPU 20, or a corresponding CPU of a suitable HMD or server) adapted (for example by suitable software instruction) to apply a head displacement pattern to a virtual first person viewpoint of the virtual environment presented to the user when the predetermined locomotive action is performed within the virtual environment, whether the user is performing the predetermined locomotive action in real life or not, the applied head displacement pattern being based upon the measured head displacement pattern, as described elsewhere herein.

It will be apparent to a person skilled in the art that variations in the above system corresponding to the various embodiments of the method as described and claimed herein are considered within the scope of the present invention, including but not limited to that the viewpoint displacement processor applies a vertical component of the measured displacement pattern of the user to the virtual first person viewpoint of the virtual environment presented to the user, as described elsewhere herein.

Also as described elsewhere herein, the at least first sensor may be built into the HMD, or may comprise a separate camera. However, alternatively or in addition the system may optionally comprise one or more selected from the list consisting of a mobile phone comprising one or more motion sensors and communication means operable to send motion data to a device comprising the viewpoint displacement processor (either directly, for example using a Bluetooth® connection to the HMD, or indirectly via a network, for example to a server administrating user accounts); a wearable fitness tracker comprising one or more motion sensors and communication means operable to send motion data to a device comprising the viewpoint displacement processor (again either directly or indirectly); and at least a first hand held controller comprising one or more motion sensors and communication means operable to send motion data to a device comprising the viewpoint displacement processor (typically directly for example using a Bluetooth® connection).

Optionally, the system may comprise an account management processor e.g. CPU 20, or a corresponding CPU of a suitable HMD or server) adapted (for example by suitable software instruction) to associate motion data characterising at least the vertical component of the head displacement pattern in association with an account of the user, and when that the user is logged in, operable to provide the motion data to an application that requests it in order to apply a head displacement pattern to a virtual first person viewpoint of a generated virtual environment presented to the user.

In this case, logged in can mean registered and/or recognised; often players share an HMD, and may do so during a game; therefore the logged user may remain the same whilst the actual user changes. In this case there will typically be a small group of users associated with the same entertainment device (and/or with the same logged-in user) who can be recognised as co-users of the HMD, for example due to relative height, interpupilary distance, and/or voice or the like, and head-bob information for that actual user can be obtained.

On a first use during game play optionally head bob data can be a default (or based on physiological measurement such as height, as described elsewhere herein), and then some or all of the predetermined locomotive actions can be measured after game play concludes or during a pause in game play.

Similarly optionally, the system may comprise a server (typically a dedicated server, but the entertainment device 10 may be treated as an example when running under suitable software instruction), in turn comprising a receiver (such as data port 60) operable to receive a measured head displacement pattern in association with one or more physiological measurements of the user, a data collation processor (e.g. CPU 20) operable (under suitable software instruction) to collate such received information to form a database of physiological and motion data; a correlation processor (e.g. CPU 20) operable (under suitable software instruction) to estimate a correlation between physiological measurements and at least a vertical component of a head displacement pattern based upon data of the database; and upon receiving one or more physiological measurements for a subsequent user, a transmitter (e.g. data port 60) operable to transmit at least a correlating vertical component of a head displacement pattern for use with that subsequent user, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of controlling a head-mounted display, comprising the steps of:
   generating a virtual environment for display from a virtual first person viewpoint of a virtual character to a user wearing a head-mounted display;
   measuring a head displacement pattern of the user when they are performing a predetermined locomotive action in real life; and
   applying a head displacement pattern to the virtual first person viewpoint of the generated virtual environment presented to the user to vary a position of the virtual first person viewpoint when the virtual character performs the predetermined locomotive action in the generated virtual environment whether or not the user is performing the predetermined locomotive action in real life, the applied head displacement pattern being based upon the measured head displacement pattern.

2. The method of claim 1, in which the predetermined locomotive action is one or more of:
   i. walking;
   ii. jogging;
   iii. running;
   iv. sprinting;
   v. jumping; and
   vi. creeping or crawling.

3. The method of claim 1, in which the head displacement pattern applied to the first person viewpoint comprises a vertical component of the measured head displacement pattern of the user.

4. The method of claim 3, in which the head displacement pattern applied to the first person viewpoint comprises a lateral component of the measured head displacement pattern of the user.

5. The method of claim 4, in which the lateral component is scaled to be smaller than the measured lateral head displacement pattern.

6. The method of claim 1, in the step of measuring the head displacement pattern of the user comprises the step of:
   obtaining motion data from the head-mounted display when worn by the user and performing the predetermined locomotive action, the motion data being one or more of:
   i. motion data from one or more accelerometers of the head-mounted display;
   ii. motion data derived from images captured by one or more cameras of the head-mounted display; and iii. motion data derived from images captured by one or more cameras remote from the head-mounted display, the captured images encompassing a view of the head-mounted display.

7. The method of claim 1, in the step of measuring the head displacement pattern of the user comprises the step of:
obtaining motion data when the user is performing the predetermined locomotive action, the motion data being one or more of:
  i. motion data from one or more accelerometers of a handheld controller held by the user;
  ii. motion data from one or more accelerometers of a mobile phone kept in an item of clothing worn by the user;
  iii. motion data from one or more accelerometers of a wearable device worn by the user; and
  iv. motion data derived from images captured by one or more cameras remote from the user, the captured images encompassing a view of the user.

8. The method of claim 1, comprising the steps of:
associating motion data characterising at least the vertical component of the head displacement pattern in association with an account of the user; and
when that the user is subsequently logged in, providing the motion data to an application that requests it in order to apply a head displacement pattern to a virtual first person viewpoint of a generated virtual environment presented to the user.

9. The method of claim 1, comprising the steps of:
obtaining one or more physiological measurements of the user and storing this physiological data in association with motion data characterising at least the vertical component of the head displacement pattern of that user;
collating associated pairs of physiological and motion data to form a database of physiological and motion data;
estimating a correlation between physiological measurements and at least a vertical component of a head displacement pattern based upon data of the database; and
upon receiving one or more physiological measurements for a subsequent user, providing at least a correlating vertical component of a head displacement pattern for use with that subsequent user.

10. A non-transitory, computer readable storage medium containing a computer program comprising computer executable instructions, which when executed by a computer system, cause the computer system to perform a method of head-mounted display, comprising:
generating a virtual environment for display from a virtual first person viewpoint of a virtual character to a user wearing a head-mounted display;
measuring a head displacement pattern of the user when they are performing a predetermined locomotive action in real life; and
applying a head displacement pattern to the virtual first person viewpoint of the generated virtual environment presented to the user to vary a position of the virtual first person viewpoint when the virtual character performs the predetermined locomotive action in the generated virtual environment whether or not the user is performing the predetermined locomotive action in real life, the applied head displacement pattern being based upon the measured head displacement pattern.

11. A system for head-mounted display, comprising:
a head-mounted display;
a virtual environment for display from a virtual first person viewpoint of a virtual character to a user wearing the head-mounted display;
at least a first sensor for measuring a head displacement pattern of the user when they are performing a predetermined locomotive action in real life; and
a viewpoint displacement processor adapted to apply a head displacement pattern to the virtual first person viewpoint of the virtual environment presented to the user to vary a position of the virtual first person viewpoint when the virtual character performs the predetermined locomotive action within the virtual environment, whether the user is performing the predetermined locomotive action in real life or not, the applied head displacement pattern being based upon the measured head displacement pattern.

12. The system of claim 11, in which: the viewpoint displacement processor applies a vertical component of the measured displacement pattern of the user to the virtual first person viewpoint of the virtual environment presented to the user.

13. The system of claim 11, comprising one or more of:
  i. a mobile phone comprising one or more motion sensors and communication means operable to send motion data to a device comprising the viewpoint displacement processor;
  ii. a wearable fitness tracker comprising one or more motion sensors and communication means operable to send motion data to a device comprising the viewpoint displacement processor; and
  iii. at least a first hand held controller comprising one or more motion sensors and communication means operable to send motion data to a device comprising the viewpoint displacement processor.

14. The system of claim 11, comprising:
an account management processor adapted to associate motion data characterising at least the vertical component of the head displacement pattern in association with an account of the user; and
when that the user is logged in, operable to provide the motion data to an application that requests it in order to apply a head displacement pattern to a virtual first person viewpoint of a generated virtual environment presented to the user.

15. The system of claim 11, comprising:
a server, in turn comprising:
  a receiver operable to receive a measured head displacement pattern in association with one or more physiological measurements of the user;
  a data collation processor operable to collate such received information to form a database of physiological and motion data;
  a correlation processor operable to estimate a correlation between physiological measurements and at least a vertical component of a head displacement pattern based upon data of the database; and
  upon receiving one or more physiological measurements for a subsequent user, a transmitter operable to transmit at least a correlating vertical component of a head displacement pattern for use with that subsequent user.

16. The method of claim 1, wherein the applied head displacement pattern is based upon the same measured head displacement pattern whenever the virtual character performs the predetermined locomotive action.

* * * * *